United States Patent
Schwarzmann et al.

(10) Patent No.: US 6,650,703 B1
(45) Date of Patent: Nov. 18, 2003

(54) PICTURE-TRANSMITTING REMOTE OBJECT INSPECTION SYSTEM

(75) Inventors: Peter Schwarzmann, Metzingen (DE); Joachim Schmid, Aalen (DE); Bernd Binder, Kirchentellinsfurt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/147,896
(22) PCT Filed: Aug. 16, 1997
(86) PCT No.: PCT/EP97/04473
§ 371 (c)(1),
(2), (4) Date: Aug. 13, 1999
(87) PCT Pub. No.: WO98/08342
PCT Pub. Date: Feb. 26, 1998

(30) Foreign Application Priority Data

Aug. 23, 1996 (DE) .......................... 196 33 997

(51) Int. Cl.⁷ .................................. H04B 7/06
(52) U.S. Cl. ............................... 375/240.01
(58) Field of Search ............... 348/42, 45, 46, 348/65, 10, 11, 12, 13; 382/110, 128, 130, 133; 709/230; 128/630, 696; 600/301; 395/203; 364/418.02; 351/212; 375/240.01; H04B 7/66

(56) References Cited

U.S. PATENT DOCUMENTS

| | | | | |
|---|---|---|---|---|
| 5,216,596 A | | 6/1993 | Weinstein | 364/413 |
| 5,297,034 A | * | 3/1994 | Weinstein | 364/413.02 |
| 5,331,551 A | | 7/1994 | Tsuruoka et al. | 364/413.13 |
| 5,432,871 A | * | 7/1995 | Novik | 382/232 |
| 5,544,649 A | * | 8/1996 | David et al. | 128/630 |
| 5,619,995 A | * | 4/1997 | Lobodzinski | 128/653.1 |
| 5,655,084 A | * | 8/1997 | Pinsky et al. | 395/203 |
| 5,704,364 A | * | 1/1998 | Saltzstein et al. | 128/696 |
| 5,793,969 A | * | 8/1998 | Kamentsky et al. | 395/200.43 |
| 5,867,821 A | * | 2/1999 | Ballantyne et al. | 705/2 |
| 5,926,210 A | * | 7/1999 | Hackett et al. | 348/158 |
| 5,987,519 A | * | 11/1999 | Peifer et al. | 709/230 |
| 5,993,001 A | * | 11/1999 | Bursell et al. | 351/212 |
| 6,011,861 A | * | 1/2000 | Ortyn et al. | 382/128 |
| 6,014,451 A | * | 1/2000 | Berry et al. | 382/110 |
| 6,101,265 A | * | 8/2000 | Bacus et al. | 382/133 |
| 6,108,027 A | * | 8/2000 | Andrews et al. | 348/15 |

FOREIGN PATENT DOCUMENTS

| | | |
|---|---|---|
| EP | 0 293 083 A2 | 11/1988 |
| GB | 2 288 511 A | 10/1995 |

* cited by examiner

Primary Examiner—Chris Kelley
Assistant Examiner—Tung Vo
(74) Attorney, Agent, or Firm—McAndrews, Held & Malloy, Ltd.

(57) ABSTRACT

An image transmitting remote object examination device includes (a) an image-recording system at the location of the object to be examined, (b) an observation station located at a distance from the image-recording system for the evaluation of the image and for the remote control of the image-recording system, and (c) an intervening, narrow band telecommunications link, by way of which the images taken are transferred to the observation station using image data compression and/or reduction together with the remote control commands to the image system. A system status-determining unit continuously records the overall system status relevant to image transmission, and dependent upon the overall system status, variably controls the image data compression and/or reduction and/or the number of individual telecommunication channels used in a transmission packet. The image quality required for a particular situation, together with the optimal on-line image impression, is thereby obtained.

14 Claims, 4 Drawing Sheets

PICTURE-TRANSMITTING REMOTE OBJECT INSPECTION SYSTEM

Figure 1:
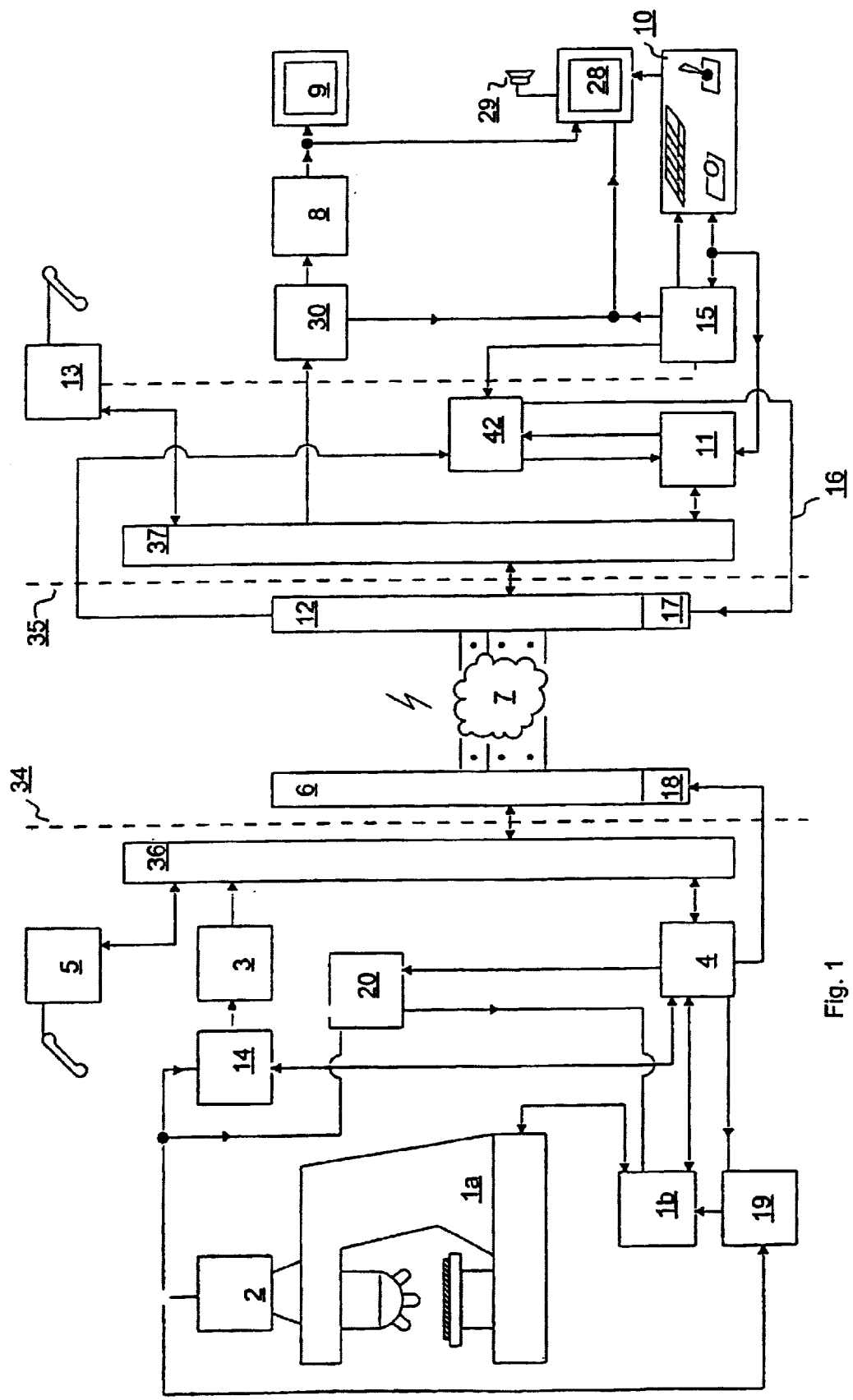

The invention refers to a remote object examination device provided with an image-recording system at the location of the object to be examined, an observation station spatially removed from it for evaluating the image and for the remote control of the image-recording system as well as with an intervening narrow-band telecommunications link, over which is transferred the image-data generated by the image-recording system to the observation-station using image data compression and/or reduction, as well as the control command signals generated from the observation station for the remote control of the image-recording system.

Such remote object examination devices are known in form of telemicroscopy systems for example, particularly as applied to telepathology. The object to be examined in this case is a tissue section prepared, for example, during an operation. The image-recording system comprises a microscope remote-controllable in all functions, an image-recording device for the microscope field, a transmitter for the image signal and a receiver for the control commands at the microscope. Transmitter and receiver as well as an additional speech channel are connected over an interface with a telecommunications link. The observation-station comprises a receiver, a monitor for the images to be returned, an appliance for the production of the control commands for the microscope and a transmitter for these control commands. The observer or expert, for example, a suitable computer or a pathologist, can appraise the transmitted microscope image. Transmitter and receiver as well as a speech channel are in turn connected by way of a suitable interface with the same telecommunications link as the image-recording system.

If the telecommunications link has a sufficient width for the transfer of a television signal, the observer at the observation station can use all functions of the spatially removed microscope just as if this were at his workplace. Such a telepathology system with wide band data transfer is described in U.S. Pat. No. 5,216,596. However, wide band telecommunication channels are comparatively costly for television signals and of only limited availability. It has already been proposed therefore, to operate telemicroscopy over the widely available and inexpensive, narrow-band channels of the telephone network. An installation with such narrow band technology employing the ISDN-Network is described by M. Oberholzer et al. In the paper "Telepathology: frozen section diagnosis at a distance" (1995), 426, page 3. However, the limited channel capacity forms a bottleneck for the transfer of the image data so that the on-line-impression for the user can be lost and instead of a moving image he will only receive a slow consecutive string of individual images. The result will be that the user will also lose the immediate impression of the effect of his microscope control commands, since for him their effect will be seen only after a substantial delay and in an altered context. The application of the technologies of video-telephony only allows the transmission with a quality of image which is inadequate for most of the applications considered here, such as telemicroscopy, teleendoscopy and telesonography.

Some measures have also already been proposed for the economic application of ISDN channels for narrow band telemicroscopy systems, such as, for example, the use of a particular auto-focus system and the application of a fixed, pre-determined, compression and reduction adapted to the particular system of the image data to be transferred, during their encoding, (see the papers by P. Schwarzmann, Telemikroskopie, Zentralbl. Pathol, 138, (1992) 6, page 383 and P. Schwarzmann et al., Telemicroscopy Stations for Telepathology Based on Broadband and ISDN Connections, 1995. 43, No. 4, page 209.

In an information bulletin published jointly by the Institute for Physical Electronics of the University of Stuttgart and German Telekom AG in 1995 on the scenario for the use of telepathology in rapid section diagnosis it is proposed to use the limited capacity of the existing ISDN-Network with the narrow-band telemicroscopy, but in an optimised form, where the system, dependent on the behavior of the user, i.e. the observer at the observation station, employs different strategies for image data-compression and reduction, for example, selection of a greater data-reduction in respect of color, local resolution and quantisation of the image data when a large number of image transfers are required per unit of time by reason of more rapid translation of the object under the microscope.

The technical problem which the invention seeks to solve is the preparation of an image transmitting remote object examination device of the type mentioned in the preamble, which is capable of automatically adapting itself in its transfer behavior very flexibly and variably to the appropriate situation, in such a way as to make optimal use of the existing narrow band data-carrying capacity.

The invention solves this problem by providing an image-transferring remote object examination device with the claimed features. This equipment comprises a system status determining unit which continuously records the entire image transfer-relevant system status including the system resources available in each case and as a function thereof automatically controls the image data compression and/or image data reduction process and/or the number of channels of a transmission path to be used in a transmission packet so that as well as the desired image-quality for a particular situation the best possible on-line image impression for the corresponding situation is also obtained in each case. In this way the device can be matched flexibly and variably in respect of image-transfer to the existing system status in each case.

This system status relevant to image-transfer and monitored by the system status-determining unit includes, depending on the system design, not only the user-behaviour, i.e. the control commands for the image-recording system entered by the observer, but also in particular the nominal condition in respect of the number individual channels of the telecommunication channel packet which are switched on, the type of telecommunication network to be used, the status of the coding unit carrying out image data compression and/or reduction, the type of image-recording equipment used and the current content of the image.

In this way, despite narrow-band telecommunication connection between the image-recording system and the observation position, the equipment in accordance with the invention is capable of maintaining for the user the impression of an on-line or real-time operation, with high image-quality. It is suitable for different types of remote object examinations, for example, remote material testing, telemicroscopy, teleendoscopy and telesonography, depending on the object examined and image-recording system employed.

With application of the equipment as a telemicroscopy system in telepathology, the pathologist is given a tool with which he can carry out telepathology with a high degree of telepresence.

In a further embodiment the parameters for the image data compression and/or reduction are among other things set as a function of the image content and the chosen image enlargement. Thus, for example, little structured, highly magnified images can, if necessary, be transferred at higher image transfer rates and lower resolutions than highly structured images of lower magnification.

A further embodiment uses as transmission path a telecommunication channel packet, where the number of channels currently used is set in accordance with the recorded system status and where the channel run times are automatically compensated for. The latter is of significance therefore, because the user himself in general has no control over the ways in which the individual communication channels, for example telephone channels, are switched. The ISDN Network technology has proved to be particularly suitable for such a packet solution.

In a further embodiment the image-recording system has auto-focus equipment available to it, the function of which is controlled as a function of the system status through a plurality of control parameters. By this means it is possible to avoid the transfer of the usually considerable quantity of image data required for image focusing alone. The control of the auto-focus equipment can be effected interactively or alternatively automatically from the system.

A further embodiment comprises an automatic brightness control on the side of the image-recording system which is optionally interactively or alternatively automatically operable. By means of such a brightness control also the transfer of image data which is redundant for image evaluation can be avoided so that he on-line impression of the images transmitted can be increased.

A further embodiment enables an impression of movement of transmitted, moving images inasmuch as the individual images, which are transferred in coarse steps which still partially overlap, and generate subsequently interpolated intervening images in the observation station and are successively brought to the display.

In a further embodiment an impression of movement of transmitted, moving images is conveyed, by not transferring the entire individual image in consecutive steps in each case during such an image movement but only the image areas which are new when compared with the preceding individual image. These image areas are then joined in the observation station to the previous individual image to produce the new individual image.

In a further embodiment the activity state of the same, i.e. of the transmission path utilization and system activity, is shown optically, acoustically and/or mechanically by means of power reaction on an associated operating control.

A further embodiment comprises, as operating control for tile observer at the observation station, a phantom, i.e. a copy, of the image-recording equipment used in the image-recording system, so that activities of the observer on the phantom are recorded and are converted into control commands for the corresponding adjustment of the real image-recording equipment.

A further embodiment is the possibility of the prophylactic transfer of image scenes, which are forecast to be required by the system at a later time, at periods with unused transfer channel capacity. For this, the equipment contains a predictor for the likely continuation of the remote examination of the object, which, for example, closes up the locations of object areas transmitted up to now to the places of the next image transfers, for example, through corresponding continuation of the path of the last transmitted areas.

In a further embodiment a representation tool may be provided for reproducing the image at the observation station, with which an overall image can be represented or a separate screen or in the form of a window inserted on the screen used for the detail images, where a marking surface of variable size defines the position of the current visual field of the image-recording equipment. If necessary, positions of the marking surface already used could remain marked on the overall image, in order to avoid duplicate examinations.

A further embodiment offers the option of the archiving selected images.

A further embodiment provides the ability to find again a certain desired image quickly and display it on the basis of the previously stored archiving data by corresponding control of the image acquisition system. This is useful, for example, if a preliminary examination first takes place and only subsequently is a definitive evaluation to be carried out on the basis of selected images. Here, it can be envisaged that the observer moves with the marking-surface to a certain area in the overall image, that is then represented at greater magnification, so that the equipment fulfills for the user a convenient magnifying glass function.

A further embodiment provides the possibility of transferring small, selectable image areas of an overall image in real time at maximum image quality, for which the capacity of the narrow band transmission path is generally adequate.

A preferred embodiment of the invention is shown in the drawings and is described below.

Figure 2:
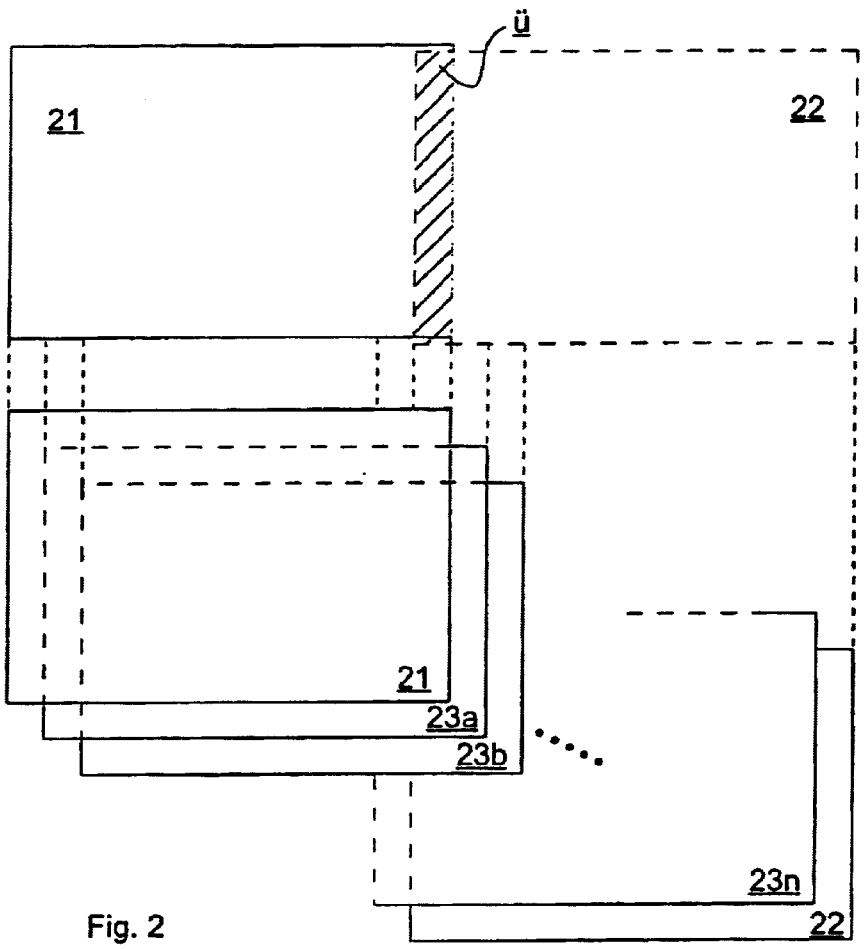
Figure 3:
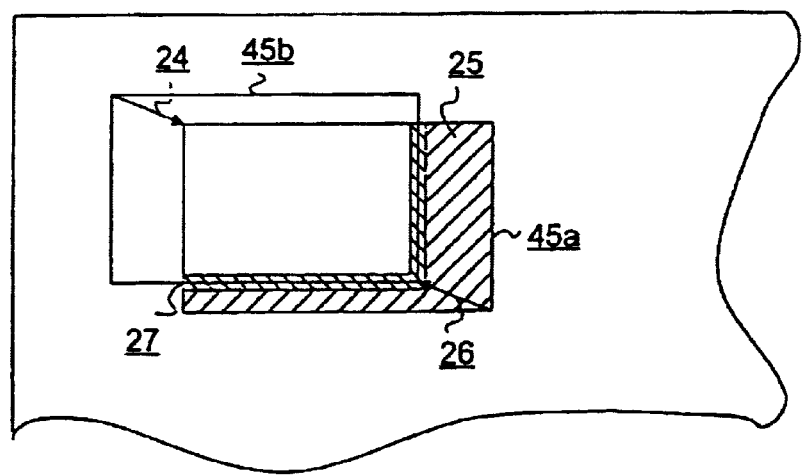
Figure 4:
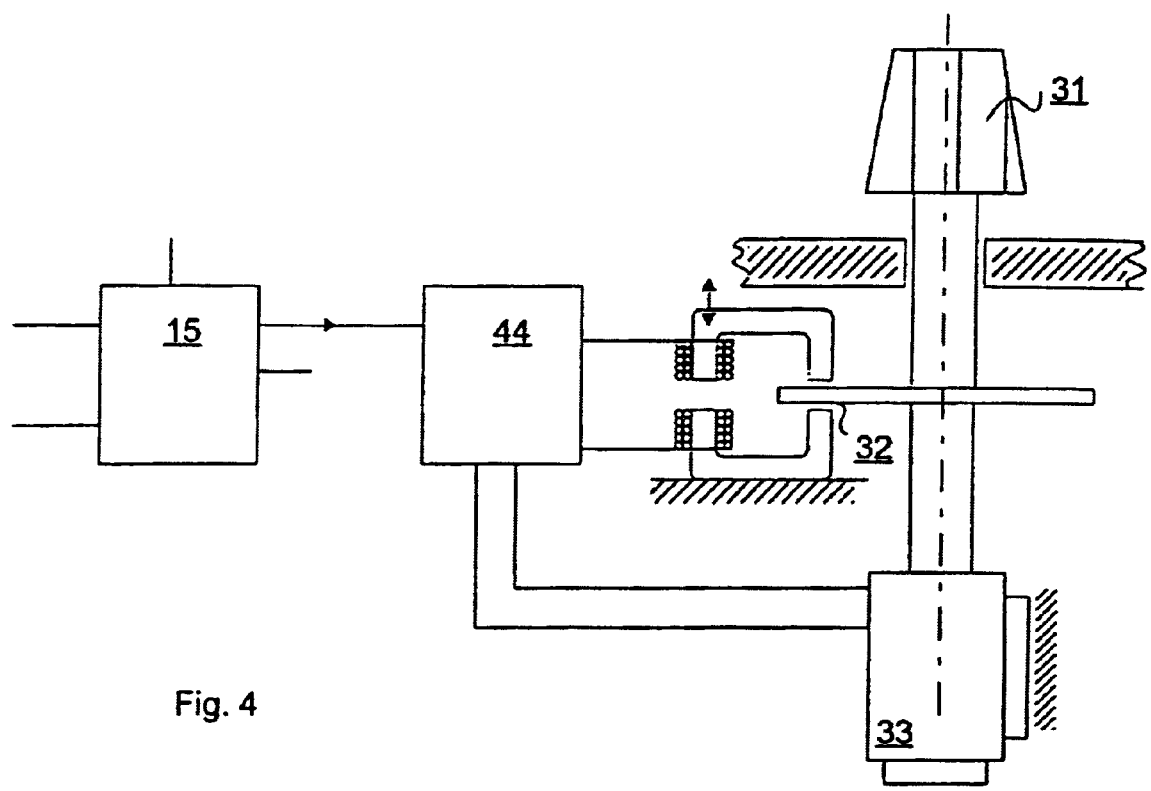
Figure 6:
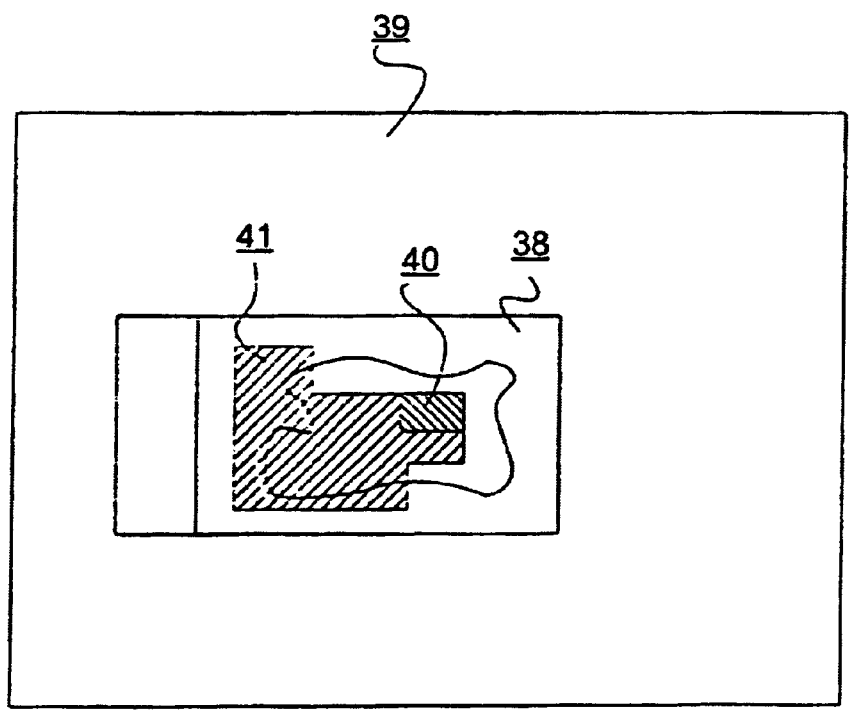
Figure 5:
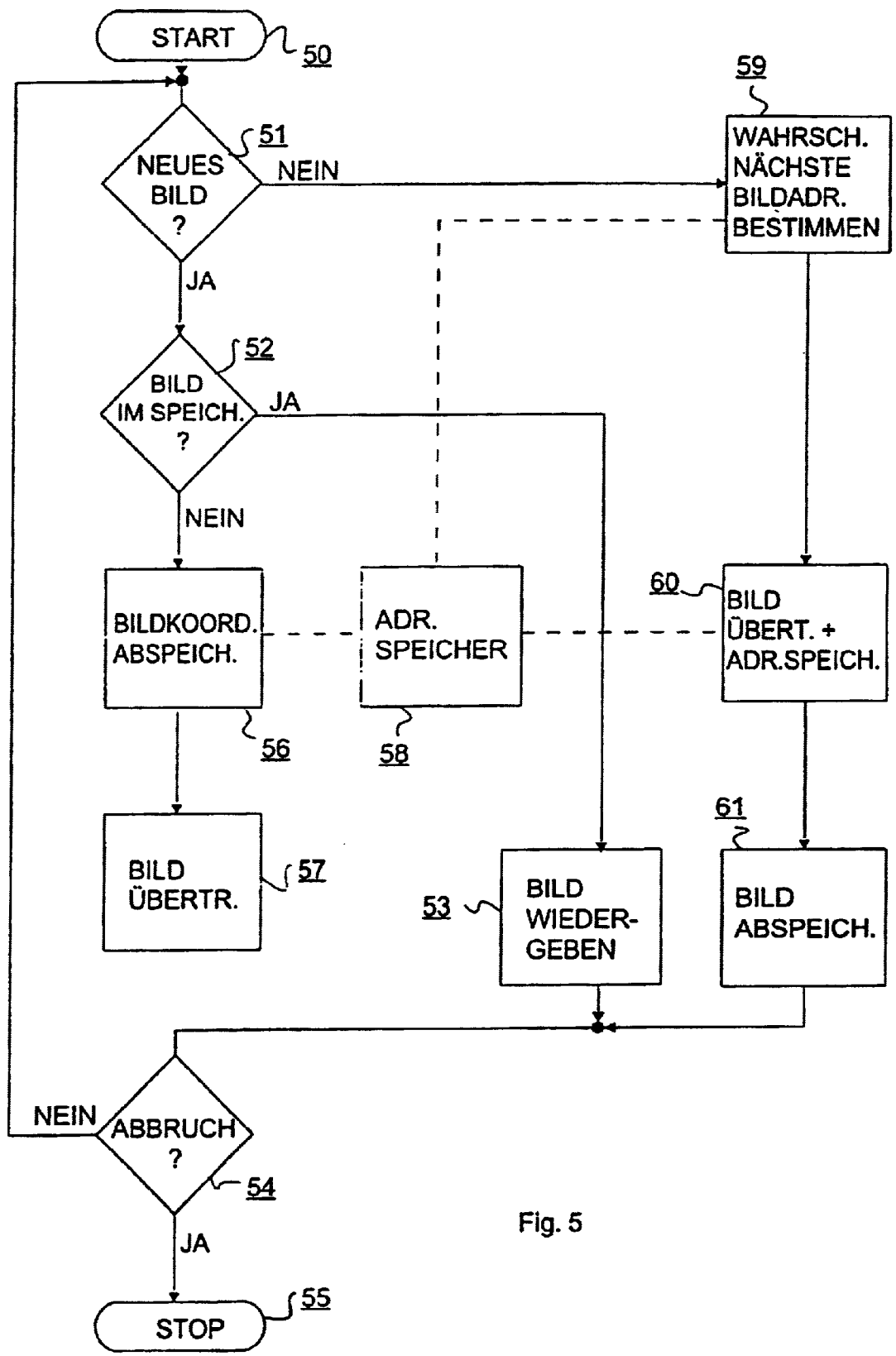

The drawings show:

FIG. 1 a block-diagram of a telemicroscopy installation with narrow band telecommunication channel transmission path, FIG. 2 a sequence of images to illustrate a first procedure for conveying an impression of movement with the telemicroscopy installation of FIG. 1, FIG. 3 a sequence of images to demonstrate a second procedure for conveying an impression of movement with the telemicroscopy installation of FIG. 1, FIG. 4 a schematic representation of a mechanical operating element power feedback for the telemicroscopy installation of FIG. 1, FIG. 5 a flow diagram of a background image transfer procedure for the telemicroscopy installation of FIG. 1 and FIG. 6 a schematic screen representation to demonstrate a procedure for investigating area marking with the telemicroscopy installation of FIG. 1.

FIG. 1 shows by means of a block diagram the construction of an image-transferring remote object examination device in form of a telemicroscopy installation which may be used, for example, for telepathology. One half of the installation comprises an image-recording system in form of a microscope station and the other half an observation station remote from the location of the microscope station, where the observer, for example a pathologist and/or an image-evaluating computer, is located.

The microscope station contains a conventional microscope 1a, all functions of which are remote-controllable, with associated microscope-control 1b, an image-recording device photographing the microscope view field 2, an image data coding device 14, which encodes the image-data supplied by the image-recording device 2 by application of conventional procedures for image-data compression and image-data reduction, a transmitter 3 and a following interface 36, which sends out the encoded image-data from the microscope-station supplied by the transmitter 3. A speech channel 5 in form of a microscope-station telephone channel is also connected to this interface 36. An auto-focus device 19 serves for the automatic focusing of the microscope 1a by issuing the corresponding focusing commands to the microscope control 1b. A brightness-control unit 20 provides for an automatic brightness-control, for which it is supplied with the image data from the image-recording equipment 2 and issues corresponding brightness control commands to the microscope control 1b. Data supplied from the microscope station by way of the interface 36 are recorded by a transmit/receive unit 4, which passes them to the relevant target components. It simultaneously serves as transmitter for the sending of status information from the microscope control 1b and the coding device 14 to the observation station, for which it is connected to these two units 14, 1b by way of duplex signal lines.

The observation station contains an image data receiver 8 with a following monitor 9 to reproduce the image, where the receiver 8 is connected through an image transmission control unit 30 to an interface 37, through which the observation station sends and receives data. Like the microscope station, the observation station also has a telephone channel 13 connected to its interface 37. In addition, the observation station has an operating unit 10, which functions as a user interface. As known from conventional telemicroscopy installations, the user can control the spatially distant microscope 1a in all its functions by inputting the corresponding control commands to the operating unit 10 for the examination of an object 43 or preparations placed under the microscope 1a, for example, in respect of the movement of the microscope table and the selection of the respective objective to provide different magnifications. The control commands are sent on the one hand by way of a transmitter/receiver unit 11 to the interface 37 and on the other to a requirement-determining unit 15, which evaluates the control command issued, to analyse user behaviour as a parameter of the system status of the installation. Like the image transmission control unit 30, the requirement-determining unit 15 also passes signals to a control display unit at the observation station, comprising a control image screen 28 and a loudspeaker 29 from one and which is in addition connected directly with the operating unit 10. The control image screen 28 may moreover be supplied with image-data received from the receiver 8.

As a further, essential component, the installation comprises a system status-determining unit 42 arranged by way of example in the observation station, which receives data signals from the requirement-determining unit 15 on the behaviour of the user to the operating unit 10 and by way of the receiver function of the transmitter/receiver unit 11 the system status-information from the microscope station which is supplied there specifically from the microscope-control 1b and the coding unit 14 over the local transmitter/receiver unit 4.

The microscope station and observation station communicate with one another by way of a virtual telescopy-microscouy device, which is shown in FIG. 1 by the area between the two broken lines 34, 35 plus the two interfaces 36, 37 of the microscope station on the one hand and observation station on the other hand and which has a universal command set for control commands, a suitable image-transfer protocol and a corresponding interface 6, 12 to an intervening, telecommunication channel packet 7 functioning as transmission path, which is constructed from a number, variable with time, of narrow band individual telecommunication channels. The virtual telemicroscopy device may be used to connect together any of several possible microscopy stations with any of several possible observation stations for the purpose of data exchange without significant adaptive measures. In order to be able to set up in each case the desired number of individual channels for the channel packet 7, the two terminal communication channel interfaces 6, 12 comprise a corresponding channel selection unit 18, 17, where the channel selection unit situated at the microscope station end 18 is controlled by the transmitter/receiver unit 4, while the other channel selection unit 17 is controlled by the system status-determining unit 42. For the recording of the system status, the system status-determining unit 42 communication channel interface 12 at the observation station end obtains data on the number of switched individual channels in each case.

The characteristics of the telemicroscopy installation of FIG. 1 are to be seen particularly in that the system status including the availability of the system resources is continuously determined by the system status-determining unit 42 and as a function thereof, on the one hand the appropriate number of individual channels condensed to a transfer channel packet of the transmission path 7 between microscope-station and observation-station is determined, and on the other hand the parameters for the image data compression and reduction in the coding unit 14 are suitably adjusted. The system status influencing parameters are especially those of the user behaviour determined from the activities carried out at the operating unit 10 determined by the requirement determining unit 15, the nominal status of the number of individual channels condensed to the transmission package, the type of transmission path 7 used, the nominal status of the coding unit 14, the type of microscope 1a and image recording equipment 2 used as well as the relevant image content. All these data are interrogated from the relevant components of the installation by the system status determining unit 42. The number of transmission channels and the type of the image data compression and reduction are then adjusted by the system status determining unit 42 in each case, so that the best possible on-line-impression is maintained despite the use of narrow band transmission channels for the image of an object lying under the microscope 43 reproduced at the monitor 9 with an image quality sufficient for any situation. For the telemicroscopy installation of FIG. 1 a number of special procedures, details of which are provided below, are envisaged for doing this.

An important point is the system status dependent image data compression and reduction in the coding unit 14. In order to make optimal use for image transfer of the transmission channel capacity, which is limited because of the narrowness of the band, the image-data from the coding unit 14 is compressed in each case and as far as allowable for the relevant application also reduced. Since the user during his work at the telemicroscopy installation places different demands on resolution, the image transfer rate and image size of the microscope image, a fixed image compression and image reduction procedure would be inconvenient. The telemicroscopy installation therefore uses a system status dependent variable image data compression and reduction. Dependent on the system status, as determined continuously by the system status determining unit 42,.particularly dependent on the requirements of the user on the system established by the requirement determining unit, the best compromise in each case between image transfer rate and image resolution is determined and set on the coding unit 14 automatically by the system. For this the system status-determining unit 42 sends corresponding coding signals over the transmitter/receiver unit 11 and the transmission path 7 to the microscope station, which there receives them from the transmitter/receiver unit 4 and relays them to the coding unit 14.

If the user shows through frequent and swift, remote-controlled movement of the preparation 43 under the microscope 1a for example or through acoustic input signals, that he wants to scan areas of the preparation quickly for a general view, then the system will set the high image rate required for this, while the image resolution can be reduced. On the other hand, the system interprets a longer pause at the same area of the preparation as indicating, that this area should be examined more precisely with a high local resolution and lower image rate, for which purpose the type of encoding will again be set suitably. The requirements derived in such a way from the user behaviour as well as from the remaining system status parameters for the image encoding serves for the control of the operating properties of the coding unit 14 with regard to lateral resolution, colour resolution and temporal resolution in the form of image transfer rate. All statuses from highest resolution with minimal image rate to very low resolution or small image field at television image rate can be automatically set in any desired steps. The coding settings are effected completely automatically and necessitate no actions from the user, which could distract him from his actual examination activity. As coding methods, conventional procedures can be used, provided they allow an intervention into their mode of operation with the aim of ensuring the above-mentioned setting of a compromise between image transfer rate and resolution, as is the case, for example, with the coding procedures commonly known under the abbreviations JPEG and MPEG. This type of variable and flexible image data compression and reduction leads to a very economical usage of the transmission channel capacity and to a situation-dependent best possible on-line impression of the transmitted image sequences.

Another measure for the optimal utilisation of the transmission capacity of the narrow band transmission path 7 wish as good as possible on-line-impression of the transmitted image-sequences is the automatic packet formation of an appropriate, variable number of narrow band individual channels. This is realisable simply and advantageously by employing the public telephone network as a transmission path, for example, since conceivably at branch exchanges several individual channels are already available there or alternatively additional connections can easily be made. Dependent on the system status, the system status-determining unit 42 decides in each case the optimal number of individual channels condensed to form a transmission packet and issues corresponding control commands for the channel selection units 17, 18, where it controls the channel selection unit 17 at the observation station side directly through a control line 16. The control commands for the other channel selection unit 18 are issued by way of the transmitter/receiver unit 11 on the observation station side and the subsequent interface 37 to the transmission path 7 and are transferred by the latter to the microscope station, where they are taken from the local transmitter/receiver unit 4 and used for the control of the relevant channel selection unit 18. Alternatively the interface 6 can be designed so that it takes the channel occupancy 12 set at the counter-interface from the data stream, so that the control by way of the transmitter/receiver unit 4 can be dropped.

In this way, it is possible to realise an automatic voting in or voting out of appropriate individual channels, where the signal to be transferred is suitably apportioned and distributed over the various channels. Such signal splitting is known in other areas of data transfer, so that it is not necessary to detail it here. With this technology care must be taken that at the receiver end the signals from the individual channels are combined again in the correct time sequence. This is an important control process, since the user has no control over the ways in which the individual telephone channels are switched through. This can happen in the one case over a ground link and in another case by way of a satellite link, for example. The ISDN Network technology has proved itself to be particularly suitable in the case of the present application for the realisation of such a channel packet solution.

By using the autofocus equipment 19 the image transmission capacity, which was otherwise required for focusing purposes, can be saved, because the transfer of very many close focus and also very high resolution images with the corresponding signal production is necessary for interactive focusing of a microscope image. This transfer of image data not relevant for the actual evaluation of the microscope image scene is avoided by the auto-focus-equipment 19, which can be activated automatically by a request for a new image extract or a different enlargement or the parameters of which can be adjusted according to the status of the system by the system status-determining unit 42. As autofocus equipment 19, equipment such as that disclosed in German Offenlegungsschrift DE =b 42 26 523Al, to which reference should be made, can be used.

In an analogous manner to this automatic focusing, the telemicroscopy station has available a brightness-control 20, which can be controlled either automatically or, dependent on the status of the system, by the system status-determining unit 42, where the latter conveys control commands to the brightness-control unit 20. This automatic brightness control also avoids the transfer of image information which is redundant for the evaluation and again allows improved utilisation of the transfer capacities to achieve an as good as possible on-line impression of the image sequences returned at the monitor 9.

The telemicroscopy installation in addition allows the impression of movement of a preparation 43 moved under the microscope 1a to be conveyed to the image sequences represented at the monitor 9, in that an on-line impression is created for such moving image sequences, for which two different procedures can be considered. It must be said in advance, that the observation of the movement of the preparation under the microscope 1a frequently represents an important bearings-aid for the user, exactly as in telepathology, and with narrow band transmission lines such a moving image impression of the microscope field of view in real-time by permanent on-line transfer is impossible because of the limited transfer channel capacities.

A first procedure for conveying an impression of movement is shown in FIG. 2. With this procedure, after transfer of an image 21, the image data transmitter 3 waits after a request from the user for a preparation movement before the transfer of a next image 22 in each case, until a sufficiently large preparation movement has taken place, which is laid down by corresponding translation threshold values. These are chosen so that the next transmitted image 22 at least partially overlaps with the previously transmitted image 21, as shown in FIG. 2 above by a hatched overlap region U. On the observation station side, i.e. in a computer assigned to the image reproducing monitor 9, a pre-determinable number of intermediate images 23a, 23b, . . . , 23n with uniform mutual displacement are generated by uniform interpolation and presented to the observer continuously one after the other between the two transmitted individual images 21, 22. The observer thus receives the impression of an even movement of the preparation that is only somewhat delayed compared with the request for movement. For this, only the two terminal individual images 21, 22 of the entire image sequence in accordance with FIG. 2, need to be transferred, while the intermediate images 23a, ..., 23n shown in FIG. 2 below are only generated at the observation station and therefore demand no transmission channel capacity.

A second possible procedure for providing the impression of movement despite a narrow band transmission path 7 is illustrated in FIG. 3. With this procedure with a preparation movement, as illustrated in FIG. 3 by a movement arrow 24, in several steps in each case only the fresh image areas entering into the field of view 25, which represent those areas of the current visual field 45a, which do not overlap with the visual field 45b of the preceding steps are transferred. Since the surface newly arriving is clearly smaller than, the total surface of the microscope field of view image areas 25 again in each case, a corresponding reduction of the quantity of image data to be transferred results. At the observation station, the transmitted image areas 25 are then joined at the existing image, which was first correspondingly shifted, as shown by the displacement arrow 26 in FIG. 3. With this procedure, the temporal delay between movement request and reaction on the monitor 9 of the observation station is smaller in comparison to the first named process, consequently the speed of movement of the preparation is somewhat more limited.

The parameters in both processes can be set entirely automatically by the system in either case, in that the latter records the preparation movement ordered by the user by way of the requirement determining unit 15. The image montage can take place so that the observer is not aware of any disturbances in the join area 27 of two consecutive images, as shown hatched in FIG. 3, which results from the fact that a small overlap area of consecutive images is used to carry out a correlation analysis and from it to decide the exact projection. Since size and direction of the requested movement are known to the system from the requirement determining unit 15, the approximate situation of the consecutive images is also known, so that the correlation analysis has only to make minor corrections. This consequently represents a mixture of prior knowledge and evaluation of image data. The system can select in each case a suitable matching image-sequencing strategy, which may extend from the movement by single columns or lines to whole images, depending on the recorded user behaviour. With it, the time-consuming and unnecessary transfer of redundant image information is eliminated.

The coding unit 14 is designed in such a way that it decides the image quality according to pre-determined measures and relays it for use at the transmitter 3. For this, quality measures, which involve the local resolution, the colour fidelity and the contrast are determined and serve to enable the extent of any image deterioration by data reduction to be appraised quantitatively and hence on the one hand the information on the image content and on the other the visual loss in picture quality be judged by a human observer. Such a judgement can also be made, if a computer aided image evaluation is intended instead of the human observer. The quantifying measures possible with these image quality measurements allow systematic optimisation of the system parameters and the investigation of optimal compromises between user demands and system limitations.

The design of the operating unit 10 serving as user interface is chosen from the point of view of being able to use the system effectively interactively, taking into account the fact that the image data throughput and with it the effective possible working speed is determined by the bottleneck of the transmission path 7. For such a design, there are different alternatives. Preferably the operating unit 10 shows the observer in ergonomically suitable manner the system loading status and limiting factors, so that the latter can organise its behaviour accordingly.

One possible design consists of indicating after a request for a microscope control action by way of the operating unit 10 through the user to show the latter on the associated control screen 28 and/or the associated loudspeakers 29 at the end of each image transfer or microscope action which, has taken place on this request, so that he can then start a new action or continue one which is already begun. The optical signalling consists of a message, such as, for example, "system carrying out objective changes" or "autofocus process running" or of a symbol or a colour, in order to show the degree of availability of the system resources, such as channel occupancy. Acoustically, the system activity status can be signalled by different pitches or sound pulse sequences, for example. With this procedure, the image transmission control unit 30 controls the control screen 28 and the loudspeaker 29 accordingly.

As further possible embodiment, a mechanical feedback can be provided, as shown in FIG. 4 in the form of a power feedback on an operating element 31 of the operating unit 10. The operating element 31 can be a rotating knob on the operating unit 10 for the remote control of the microscope table, for example. The degree of system performance or, in the borderline case, system overload is shown to the user mechanically by way of power feedback to the operating element 31. For this, the initial data on system status, as determined by the system status determining unit 42, is received through a control unit 44 of the operating unit 10, sets a defined friction by means of a frictional force servo component 32 and/or an active reaction force by means of a force feedback motor 33 as a function of the input data. With obstruction of the installation, the operating element 31 is also blocked. If present, the strength of the force sent back signals not only the force on he microscope but also in particular the occupancy status of the installation or its busiest component, which is generally the transmission path 7. The user senses immediately, whether he can continue his action or start a new action.

The ergonomic adaptation of the operating unit 10 to the field of application is an important point for the acceptance of such an installation, for example, as telemicroscopy installation in medicine. One embodiment may, for example, take the form of an operating mouse, with which all microscope actions are controlled by a device similar to a computer mouse. I addition to the current mouse technology, one possible solution is a close adaptation to a conventional microscope work station, which consists of forming the operating unit 10 as a phantom microscope, which takes the form of a microscope reproducing the real microscope of the image recording system without optics, but otherwise with all operating elements. These operating elements are connected with transmitters for recording the user requests and if necessary with the afore-mentioned force feed-backs in accordance with FIG. 4 and permit the control of the actual microscope 1a of the microscope station,.through manifest operating actions at the phantom microscope of the observation station. The phantom-microscope provides the user with equipment which he is accustomed to working with, so that he does not need to readapt or to train. The only difference from his conventional job is the observation of the microscope view field on the monitor 9 at the observation station instead of through the microscope eyepiece.

As further functionality, the telemicroscopy installation shown has the ability to transfer images prophylactically. Proceeding from the fact that in a detailed examination of images in general, time intervals appear, in which the existing transmission channel capacity is not used, these time intervals are used by the installation to transfer further images in the background from areas of the microscope view field, on the assumption that they will subsequently be required by the user. For this, the installation contains a predictor, not shown in derail, for the likely continuation of an examination. This predictor infers the locations for the next image transfer from the locations of the previously transmitted areas of the preparation. The program course for such image transfers is shown as a flow diagram in FIG. 5.

After a start step 50 there next follows a query seep 51 to determine whether a new image request is available. If this is the case, a check is made in a subsequent retrieval step 52, as to whether the image now requested has already been recorded as previously transmitted background image in an associated storage. If this is the case, this stored image can be immediately be called up from the storage in the next step,53 and shown on the monitor. A following retrieval step 54 then judges, whether the program run has been interrupted so that a stop 55 is reached or whether there should be a jump back to behind the start step 50 to carry out a new program cycle.

If it emerges in the associated retrieval step 52, that the newly ordered image is not yet available in memory, the coordinates of the image field are first stored (step 56), after which the new image ordered is then transferred (step 57), so that it can be shown on the monitor. For the storage of the image co-ordinates, a corresponding address memory 58 is envisaged, which is symbolically connected in FIG. 5 by the broken lines with those points in the program relevant to it.

If it is found in the relevant retrieval step 51 that there is no new image request, the predictor in the next step 59 determines the most likely next image address, for example, by extending the track of the previous transmitted preparation areas by a previously determined incremental displacement. This most likely next image is then transferred to the background during a period of unused transmission channel capacity and its address is stored (step 60). The transmitted image field is then stored in the associated image memory (step 61), where it is then ready for retrieval. Finally, the disconnect enquiry step 54 is continued. This prophylactic image transfer in the background effects an improvement in the image display speed, since the most likely next image is frequently already available at the observation station in the image-storage at the moment when it is required and only needs to be called from there.

Another advantageous measure, found with the telemicroscopy installation of FIG. 1, relates to the permanent;orientation help for the observer, as shown in FIG. 6. This guidance comprises the use of a separate monitor screen 39, on which is represented an overall image 38 of the object accumulated since the start of the examination. Alternatively this overall image representation can also be presented as an inserted window on the image monitor 9 or on the display screen 28. In the overall image is a marking rectangle 40, variable in size, which indicates the position of the current microscope viewing field in the overall image, where the size of the marking rectangle 40 represents the area of the current visual field in respect of the overall image. With a selectable operating mode every viewing field which has once been visited and examined in the overall image 38 is shown in colour, so that the total colour marked area 41 shows the preparation area already examined in each case, which gives the user a rapid overview of the situation and the surface of the areas of the preparation already examined. This avoids duplicate examinations of preparation areas, which again reduces the data flow.

The telemicroscopy installation shown possesses the further functionality of being able to transfer small image areas in real time. This is based on the fact that the transmission capacity of the transmission path 7 is normally enough to transfer a small segment of image from the entire image scene in real-time. This function can be used in telepathology, for example, to focus on single cell nuclei in several focus levels. The user chooses the appropriate detail-image with a small, part image framework (not shown) in the overall image 38 in accordance with FIG. 6 and can then request an image-transfer in real-time with maximum image quality for the framed image section.

In addition, the telemicroscopy installation shown allows the archiving of selected image scenes. With this function, the user is given the possibility of storing selected image scenes in a data base or electronic patient file. A comment is stored with the image, indicating the place of the image in the overall preparation examined together with all reception conditions, especially the microscope settings employed. Simultaneously, these images are held ready in thumbnail format on the image-rendering monitor 9 during the examination of a case.

As counterpart to this archiving function moreover, the telemicroscopy installation shown allows the possibility of calling up again selected preparation locations. By selecting a thumbnail image or by calling from the data base or the patient card the desired image-scene of the preparation, by means of the data stored with it relating to the image location and the microscope parameters, is called up and displayed. If required, the examination of the preparation can be continued subsequently in the neighbourhood of this image location. This functionality is especially useful, if first the preparation is pre-examined and subsequently assessed by an expert on the basis of the image-scenes selected in advance.

In the telemicroscopy installation shown moreover, a magnifier function is implemented for the inspection of pre-selected preparation locations, with which the observer in the overall image 38 in accordance with FIG. 6 can jump to a selectable position and examine the same with a higher enlargement. This magnifying glass function is executed automatically by the system. The previous state of enlargement and the previous examination location are automatically restored again at the end of a magnifying glass function process. This functionality offers the user the possibility of detailed examinations with relatively few system inputs required from him.

In order to offer the users on the two sides of the telemicroscopy installation, for example the pathologist on the observation station side and the operating personnel on the microscope station side, an optical discussion-aid, the telemicroscopy installation shown possesses a pointer-symbol for each partner in the discussion. The two pointer symbols are different in colour and/or shape and are steered and moved by the respective station and also shown on any other station, which makes the discussion of image details between the separated remote partners to the discussion easier and unambiguous.

It is to be understood, that the different functional components of the telemicroscopy installation shown in FIG. 1, can in each case take the form of separate prefabricated parts or of integrated units for example of a computer, in so far as they can be realised in software instead of hardware, as is well-known to the expert. It is further to be understood, that the expert, in addition to that shown, can realise other telemicroscopy installations in accordance with the invention and moreover that the invention includes other types of remote object examination devices, especially teleendoscopy and telesonography installations. With teleendoscopy installations, the microscope in the telemicroscopy installation shown is replaced with a remote-controlled endoscope or with an endoscope controlled by an operator. In telesonography installations, the microscope of the telemicroscopy installation shown is replaced with a remote-controlled or operator-controlled sonography system. In addition, the same advantageous procedures can also be achieved with these types of installation, as detailed above for the telemicroscopy installation.

What is claimed is:

1. In an image transmitting remote object examination device comprising:
   (a) an image recording system disposed at a location of an object to be examined;
   (b) an observation station located at a distance from the image recording system, the observation station capable of evaluating the image and remotely controlling the image recording system; and
   (c) a narrow-band telecommunications link interposed between the image recording system and the observation station, whereby images recorded at the image recording system are transmitted to the observation station by the narrow band telecommunications link using at least one of image data compression and image data reduction, the narrow band telecommunications link also transmitting remote control signals to the image recording system;
   the improvement comprising:
      an automated system status determining unit for continuously supervising the automated management of image transmission, and as a function of determined system status, including availability of system resources, variably and automatically controlling at least one of the image data compression, the image data reduction and the number of individual telecommunication channels employed in the transmission of the image data.

2. The improved image transmitting remote object examination device of claim 1, wherein parameters for the at least one of image data compression and image data reduction are set as a function of image content and image enlargement.

3. The improved image transmitting remote object examination device of claim 1, wherein a variable number of telecommunication channels serves as a transmission path, the number of channels being determined by the system status determining unit as a function of the determined system status, the system status determining unit also automatically compensating for channel duration.

4. The improved image transmitting remote object examination device of claim 1, wherein the image recording system comprises an automatic image focusing mechanism.

5. The improved image transmitting remote object examination device of claim 1, wherein the image recording system comprises an automatic brightness control mechanism.

6. The improved image transmitting remote object examination device of claim 1, wherein the observation station is capable of matching a previously recorded image with only the area in a subsequent image that is not contained in the previously recorded image.

7. The improved image transmitting remote object examination device of claim 1, wherein the observation station further comprises at least one of an optical display, an acoustic display and a mechanical force feedback display of system status information.

8. The improved image transmitting remote object examination device of claim 1, wherein the observation station further comprises a phantom image recording mechanism for reproducing a recorded image as a system operating parameter.

9. The improved image transmitting remote object examination device of claim 1, wherein images are periodically transmitted to and stored at the observation station, the images being selected based upon the probability that the images will be subsequently required by the system.

10. The improved image-transmitting remote object examination device of claim 1, wherein the observation station has a storage mechanism for archiving data for transmitted images.

11. The improved image-transmitting remote object examination device of claim 1, the improvement further comprising a mechanism for viewing image field areas in real time.

12. An image transmitting remote object examination device comprising:
   (a) an image recording system disposed at a location of an object to be examined;
   (b) an observation station located at a distance from the image recording system, the observation station capable of evaluating the image and remotely controlling the image recording system, the observation station comprising a mechanism for generating and displaying intermediate images between successively transmitted, partially overlapping individual images;
   (c) a narrow-band telecommunications link interposed between the image recording system and the observation station, whereby images recorded at the image recording system are transmitted to the observation station by the narrow band telecommunications link using at least one of image data compression and image data reduction, the narrow band telecommunications link also transmitting remote control signals to the image recording system; and
   (d) an automated system status determining unit for continuously supervising the automated management of image transmission, and as a function of determined system status, including availability of system resources, variably and automatically controlling at least one of the image data compression, the image data reduction and the number of individual telecommunication channels employed in the transmission of the image data.

13. An image transmitting remote object examination device comprising:
   (a) an image recording system disposed at a location of an object to be examined;
   (b) an observation station located at a distance from the image recording system, the observation station capable of evaluating the image and remotely controlling the image recording system;
   (c) a narrow-band telecommunications link interposed between the image recording system and the observation station, whereby images recorded at the image recording system are transmitted to the observation station by the narrow band telecommunications link using at least one of image data compression and image data reduction, the narrow band telecommunications link also transmitting remote control signals to the image recording system;
   (d) an automated system status determining unit for continuously supervising the automated management of image transmission, and as a function of determined system status, including availability of system resources, variably and automatically controlling at least one of the image data compression, the image data reduction and the number of individual telecommunication channels employed in the transmission of the image data; and (e) a display capable of representing an overall image of an object in which the current viewing field and optionally the areas of the object already examined are represented as respective marker areas.

14. An image transmitting remote object examination device comprising;

(a) an image recording system disposed at a location of an object to be examined;

(b) an observation station located at a distance from the image recording system, the observation station capable of evaluating the image and remotely controlling the image recording system, the observation station having a storage mechanism for archiving data for transmitted images;

(c) a narrow-band telecommunications link interposed between the image recording system and the observation station, whereby images recorded at the image recording system are transmitted to the observation station by the narrow band telecommunications link using at least one of image data compression and image data reduction, the narrow band telecommunications link also transmitting remote control signals to the image recording system;

(d) an automated system status determining unit for continuously supervising the automated management of image transmission, and as a function of determined system status, including availability of system resources, variably and automatically controlling at least one of the image data compression, the image data reduction and the number of individual telecommunication channels employed in the transmission of the image data;

wherein the system is capable of automatically adjusting current images on the basis of archived data.

* * * * *